(12) United States Patent
Hagemeier et al.

(10) Patent No.: US 10,137,478 B2
(45) Date of Patent: Nov. 27, 2018

(54) CLASSIFIER AND METHOD FOR OPERATING A CLASSIFIER

(71) Applicant: THYSSENKRUPP INDUSTRIAL SOLUTIONS AG, Essen (DE)

(72) Inventors: Olaf Hagemeier, Beckum (DE); Karsten Melies, Gütersloh (DE); Matthias Wuwer, Lippetal (DE); Ludger Schulte, Ahlen (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 655 days.

(21) Appl. No.: 14/768,045

(22) PCT Filed: Feb. 10, 2014

(86) PCT No.: PCT/EP2014/052543
§ 371 (c)(1),
(2) Date: Aug. 14, 2015

(87) PCT Pub. No.: WO2014/124899
PCT Pub. Date: Aug. 21, 2014

(65) Prior Publication Data
US 2016/0001327 A1    Jan. 7, 2016

(30) Foreign Application Priority Data

Feb. 15, 2013    (DE) .................. 10 2013 101 517

(51) Int. Cl.
*B07B 7/08*    (2006.01)
*B07B 7/083*    (2006.01)
(Continued)

(52) U.S. Cl.
CPC .............. *B07B 7/083* (2013.01); *B02C 21/00* (2013.01); *B07B 9/02* (2013.01); *B02C 2015/002* (2013.01)

(58) Field of Classification Search
CPC .. B07B 7/04; B07B 7/08; B07B 7/083; B02C 23/10
See application file for complete search history.

(56) References Cited

U.S. PATENT DOCUMENTS

| | | | |
|---|---|---|---|
| 3,015,392 A | * | 1/1962 | Rozsa .................... B07B 7/083 209/134 |
| 4,818,376 A | * | 4/1989 | Tanaka .................... B07B 4/025 209/135 |

(Continued)

FOREIGN PATENT DOCUMENTS

| | | |
|---|---|---|
| CN | 1953823 A | 4/2007 |
| DE | 3808023 A | 9/1989 |

(Continued)

OTHER PUBLICATIONS

German language International Search Report for International patent application No. PCT/EP2014/052543; dated May 2, 2014.

(Continued)

*Primary Examiner* — Joseph C Rodriguez
(74) *Attorney, Agent, or Firm* — thyssenkrupp North America, Inc.

(57) ABSTRACT

A classifier for classifying granular feedstock has a rotary cage rotating about a rotor axis and an air-guiding system arranged around the rotary cage, wherein a classifying zone is formed between the rotary cage and the air-guiding system. In the classifying zone one or more baffles are arranged such that the torque acting on the rotary cage is increased—for the same rotational speed—by at least 20% with respect to an embodiment without baffles and/or the separation between the air-guiding system and the rotary cage is chosen such that the torque acting on the rotary cage is increased—for the same rotational speed—by at least 20% with respect to an embodiment wherein the separation of the (Continued)

air-guiding system is without influence on the torque of the rotary cage.

16 Claims, 13 Drawing Sheets

(51) Int. Cl.
  *B07B 9/02* (2006.01)
  *B02C 21/00* (2006.01)
  *B02C 15/00* (2006.01)

(56) References Cited

U.S. PATENT DOCUMENTS

| | | | | |
|---|---|---|---|---|
| 5,094,391 A * | 3/1992 | Tamashige | ............... | B07B 7/083 241/79.1 |
| 5,158,182 A * | 10/1992 | Fischer-Helwig | ...... | B07B 7/083 209/135 |
| 5,533,629 A * | 7/1996 | Ito | ............... | B07B 7/083 209/714 |
| 6,342,551 B1 * | 1/2002 | Jolley | ............... | C09D 5/034 524/210 |
| 6,827,221 B1 * | 12/2004 | Brundiek | ............... | B02C 23/16 209/208 |
| 7,654,396 B2 * | 2/2010 | Takeno | ............... | B07B 7/01 209/143 |
| 8,353,408 B2 * | 1/2013 | Ito | ............... | B07B 7/083 209/134 |
| 8,714,359 B2 * | 5/2014 | Aizawa | ............... | B02C 23/12 209/142 |
| 8,915,373 B2 * | 12/2014 | Lin | ............... | B23P 17/04 209/139.1 |
| 9,527,112 B2 * | 12/2016 | Brulefert | ............... | B07B 7/083 |
| 2017/0304843 A1 * | 10/2017 | Hagemeier | ............... | B02C 23/02 |

FOREIGN PATENT DOCUMENTS

| | | |
|---|---|---|
| DE | 19606672 A | 8/1997 |
| DE | 19708956 A | 9/1998 |
| DE | 19961837 A1 | 6/2001 |
| DE | 10030705 A1 | 1/2002 |
| DE | 10040293 A1 | 2/2002 |
| EP | 1153551 A | 11/2001 |
| EP | 2204240 A1 | 7/2010 |
| JP | H02303560 A | 12/1990 |
| JP | H07-51629 A | 2/1995 |

OTHER PUBLICATIONS

English translation of International Search Report for International patent application No. PCT/EP2014/052543; dated May 2, 2014.

* cited by examiner

CLASSIFIER AND METHOD FOR OPERATING A CLASSIFIER

CROSS REFERENCE TO RELATED APPLICATIONS

This application is a U.S. National Stage Entry of International Patent Application Serial Number PCT/EP2014/052543, filed Feb. 10, 2014, which claims priority to German patent application no. DE 102013101517.4 filed Feb. 15, 2013, the entire contents of both of which are incorporated herein by reference.

FIELD

The invention relates to a classifier for classifying granular feedstock and to a method for operating a classifier.

BACKGROUND

In the case of the grinding system in open-circuit operation, the grinding stock is fed once through the grinding plant and then has the desired product properties with respect to fineness and grain distribution. It would be possible to achieve a marked increase in the efficiency of the grinding system by using classifiers, wherein the grinding stock is passed through a mill-classifier circuit. In this context, the fresh material can be fed in upstream or downstream of the mill. Overgrinding, as in open-circuit operation, is reduced and the product properties can be set better. The mills used in cement and mineral production are in particular ball mills, vertical and horizontal roller mills, attritors and high-pressure roll presses. The throughput power of these mills is, however, limited and approximately constant independent of the separation result in the classifier. Therefore, when using these mills, the quantity of finished product per hour can be increased only by means of an improvement in classification.

Improved classification means that there is less fine material (finished product) in the coarse material of the classifier and, accordingly, the fraction recirculated to the mill is reduced, such that an accordingly greater fraction of fresh material can be processed in the mill.

In the past, classifiers developed from a static to a dynamic air stream classification. That means that the air flow and gravity were supplemented by rotation. The conventional construction involves an air-guiding system being arranged around a rotating rotary cage, such that a classifying zone forms between the rotary cage and the air-guiding system. The feedstock to be classified is introduced either with the classifying air stream through the air-guiding system and/or directly into the classifying zone from above. In order to achieve as homogeneous as possible a flow in the classifying zone, a great variety of air-guiding systems and rotary cage shapes have been developed.

Since, in cement and mineral production, the material to be classified has a tendency to agglomerate, further measures have been used, in order to increase efficiency, which deagglomerate and/or better distribute the grinding stock within the classifier. To that end, for example in the case of embodiments in which grinding stock is supplied via the rotor cover, so-called impact strips have been provided, which at least partially break up the agglomerates. In DE 100 40 293 A1, the air-guiding system is formed by conical trickle baffles, such that the grinding stock supplied from above at least partially deagglomerates through contact with the conical trickle baffles. A further measure for improving classification efficiency involves increasing the circumferential speeds at the rotary cage by means of higher rotational speeds. However, this can be brought about only in conjunction with a higher flow speed, in order to retain the product properties (in particular fineness). Although this coupling leads to an improvement in classification efficiency, higher rotor rotational speeds and higher volume flow rates are necessary.

SUMMARY

The invention is hence based on the object of improving the classification efficiency of classifiers with a rotary cage rotating about a rotor axis, and an air-guiding system arranged around the rotary cage.

In that context, the method according to the invention for operating a classifier for classifying granular feedstock has the following method steps:
  rotating a rotary cage,
  aspirating classifying air, through an air-guiding system surrounding the rotary cage, into a classifying zone formed between the rotary cage and the air-guiding system and
  feeding the granular feedstock into the classifying zone, wherein in the classifying zone one or more baffles are arranged such that the torque acting on the rotary cage increases—for the same rotational speed—by at least 20% with respect to an embodiment without baffles and/or
  the separation between the air-guiding system and the rotary cage is chosen such that the torque acting on the rotary cage increases—for the same rotational speed—by at least 20% with respect to an embodiment wherein the separation of the air-guiding system is without influence on the torque of the rotary cage.

BRIEF DESCRIPTION OF THE DRAWINGS

The present disclosure is described in detail below with reference to the attached drawing figures, wherein.

DETAILED DESCRIPTION

Figure 1:
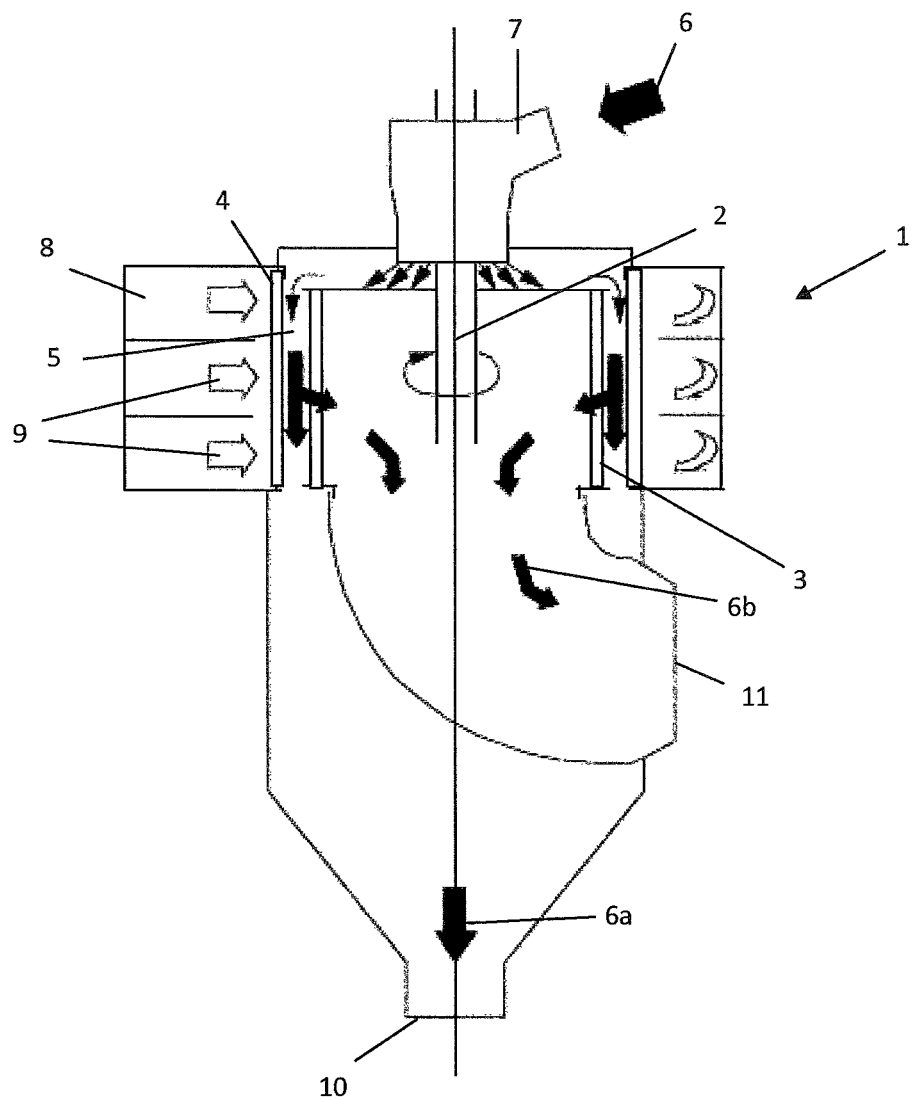
FIG. 1 is a schematic cross section view of an embodiment of a classifier having a separate material feed, as disclosed herein.

The classifier, according to the invention, for classifying granular feedstock has a rotary cage rotating about a rotor axis and an air-guiding system arranged around the rotary cage, wherein a classifying zone is formed between the rotary cage and the air-guiding system. In the classifying zone one or more baffles are arranged such that the torque acting on the rotary cage is increased—for the same rotational speed—by at least 20% with respect to an embodiment without baffles and/or the separation between the air-guiding system and the rotary cage is chosen such that the torque acting on the rotary cage is increased—for the same rotational speed—by at least 20% with respect to an embodiment wherein the separation of the air-guiding system is without influence on the torque of the rotary cage.

Providing baffles in the classifying zone and/or reducing the separation between the air-guiding system and the rotary cage generates, at least in certain regions of the classifying zone and in a targeted manner, an inhomogeneous flow. This is a conscious departure from the concept, followed hitherto, of as homogeneous a flow as possible, and it was surprisingly ascertained, in the trials underpinning the invention, that more effective classification takes place precisely by virtue of the inhomogeneous flow. This measure reduces the bypass, that is to say that fraction of the fine material which is rejected by the classifier together with the coarse material.

If the classifier is used in a recirculating grinding plant, it is indeed necessary, because of the reduced bypass, to take into account a higher torque and accordingly greater operating power of the classifier, but in so doing the quantity of coarse material recirculated to the mill is correspondingly reduced, such that the mill can instead process more fresh material. The energy requirements of the mill thus remain essentially unchanged, while at the same time the processing rate for fresh material is increased, such that the overall energy consumption of the mill and the classifier per tonne of fine material (finished product) is reduced.

The above classifier and/or the associated method is however also advantageous if the classifier is to produce two finished products of different grain sizes, since the fine material, and thus the higher-value fraction, is produced in an accordingly higher proportion.

The increase in efficiency of the classifier is based on the fact that the baffles in the classifying zone or the air-guiding system positioned closer to the cage increase the deagglomeration of the feedstock to be classified. By virtue of the baffles or of the narrowed classifying zone, there also arise flow constrictions which can increase the kinetic energy of the feed particles many times. The drag forces of the rotary cage rotation and the baffles then repeatedly subject the feedstock to deagglomeration and again classification at the rotary cage, wherein the particles break down and can be classified more effectively.

Further configurations of the invention form the subject matter of the subclaims.

The granular feedstock to be classified can be fed, together with the classifying air, through the air-guiding system and/or at least partially separately from the classifying air, to the classifying zone.

The rotary cage can be of cylindrical, frustoconical and/or stepwise shape. The largest diameter of the rotary cage should be at least 0.5 m, preferably at least 1 m. However, other rotary cages having diameters of up to or greater than 8 m are also conceivable.

The separation between the air-guiding system and the rotor is preferably less than 60 mm, preferably ≤55 mm, and most preferably ≤50 mm. The increase in torque brought about by the baffles and/or the separation between the air-guiding system and the rotary cage is preferably at least 25%, wherein further bypass reductions are possible at values of at least 30% and/or at least 50%. The trials underpinning the invention have also shown that torque increases of at least 75% or even at least 100% effect a still greater increase in efficiency.

According to a further configuration of the invention, it is possible to set the separation between the guiding system and the rotary cage and/or between the baffles and the rotary cage, such that the system can be geared in a manner targeted to the available drive power of the rotary cage. According to a further variant of the invention, the air-guiding system consists of a multiplicity of guide plates (guide vanes and/or curved blades and/or trickle plates), wherein the baffles arranged in the classifying zone are attached to some or all of these guide plates. It is also conceivable for the baffles to be formed by end regions of some guide plates, wherein the end regions project into the classifying zone. In that context, the baffles can extend over all or only part of the axial extent of the rotary cage, and can be oriented parallel or not parallel to the rotor axis.

It can furthermore be provided that the rotary cage has additional components, which project into the classifying zone and which rotate with the rotary cage, for generating an inhomogeneous flow field in the classifying zone. According to a preferred configuration of the invention, the rotary cage rotates about a vertically oriented axis.

Further, the invention relates to a grinding plant, in particular a recirculating grinding plant, for grinding granular feedstock, having a mill and, connected to the mill, a classifier as described above.

The present disclosure will be discussed in further detail below with reference to the attached drawing figures.

FIG. 1 shows a classifier 1 having a cylindrical rotary cage 3 rotating about a rotor axis 2 and an air-guiding system 4 arranged around the rotary cage, wherein a classifying zone 5 is formed between the rotary cage and the air-guiding system. In the exemplary embodiment shown, granular feedstock 6 which is to be classified is fed, via a material feed 7 arranged above the rotary cage 3, onto the cover of the rotary cage 3. Classifying air 9 is supplied to the classifying zone 5 via a classifying air supply 8 and the air-guiding system 4.

The feedstock 6 fed onto the cover of the rotary cage 3 is urged outward by centrifugal force, and there falls down into the classifying zone 5. Coarse material 6a of the feedstock 6 falls out at the bottom and is removed via a coarse material outlet 10, while the fine material 6b is drawn, together with the classifying air 9, into the rotary cage 3 and is ejected via a fine material outlet 11.

Figure 2:
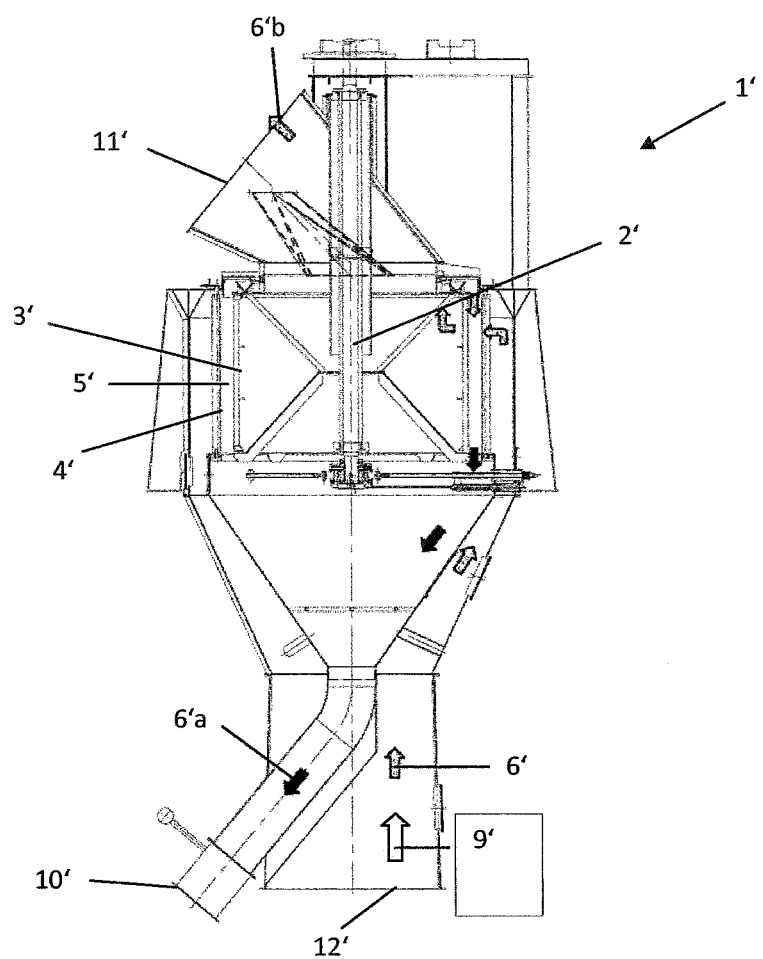
FIG. 2 is a schematic cross section view of an embodiment of a classifier with a common material and classifying air supply, as disclosed herein.

FIG. 2 shows a classifier 1' according to a second exemplary embodiment, which also has a rotary cage 3' which rotates about a vertical rotor axis 2', and an air-guiding system 4' which surrounds the rotary cage, wherein a classifying zone 5' is formed between the rotary cage and the air-guiding system. The feedstock 6' to be classified is in this case supplied together with the classifying air 9' via a common material and classifying air feed 12', and enters the classifying zone 5' via the air-guiding system 4'. It is however also conceivable that, in addition, part of the feedstock is supplied to the classifying zone 5' separately from the classifying air, for example via the cover of the rotary cage 3' as in FIG. 1. The coarse material 6'a falling down from the classifying zone 5' is again removed via a coarse material outlet 10' and the fine material 6'b drawn into the rotary cage with the classifying air 9' is removed via a fine material outlet 11'.

Figure 3:
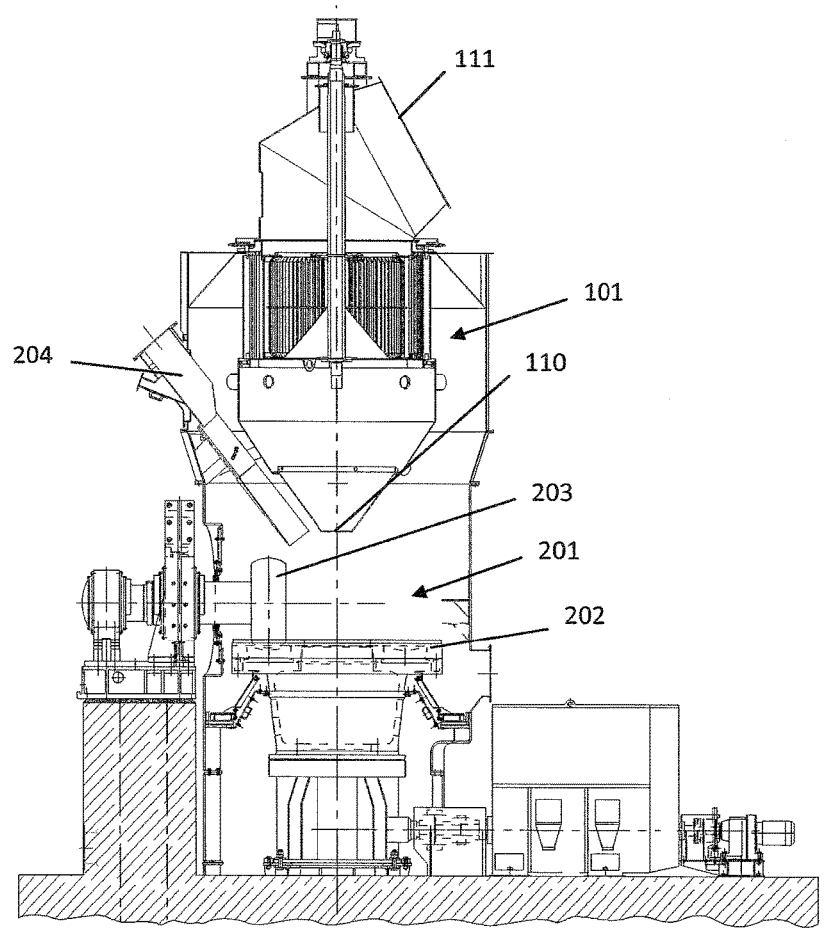
FIG. 3 is a schematic cross section view of an embodiment of a vertical roller mill with integrated classifier, as disclosed herein.

FIG. 3 shows a special exemplary embodiment of a recirculating grinding plant having a vertical roller mill 201 that has a grinding plate 202 and grinding rolls 203 rolling thereupon. The material to be comminuted is supplied via a material feed 204 above the middle of the grinding plate 202. A classifier 101 according to the invention is integrated into the mill housing, above the grinding plate 202. The material comminuted by the grinding rollers 203 exits via the rim of the grinding plate 202 and is then caught by an upwards-flowing classifying air flow and is introduced into the classifier 101. The classifier is designed, for example, according to one of the exemplary embodiments represented in FIGS. 1 and 2. The coarse material of the classifier 101 is supplied, via the coarse material outlet 110, back to the grinding plate 202, while the classifying air, together with the fine material, is removed via the fine material outlet 111.

Figure 4:
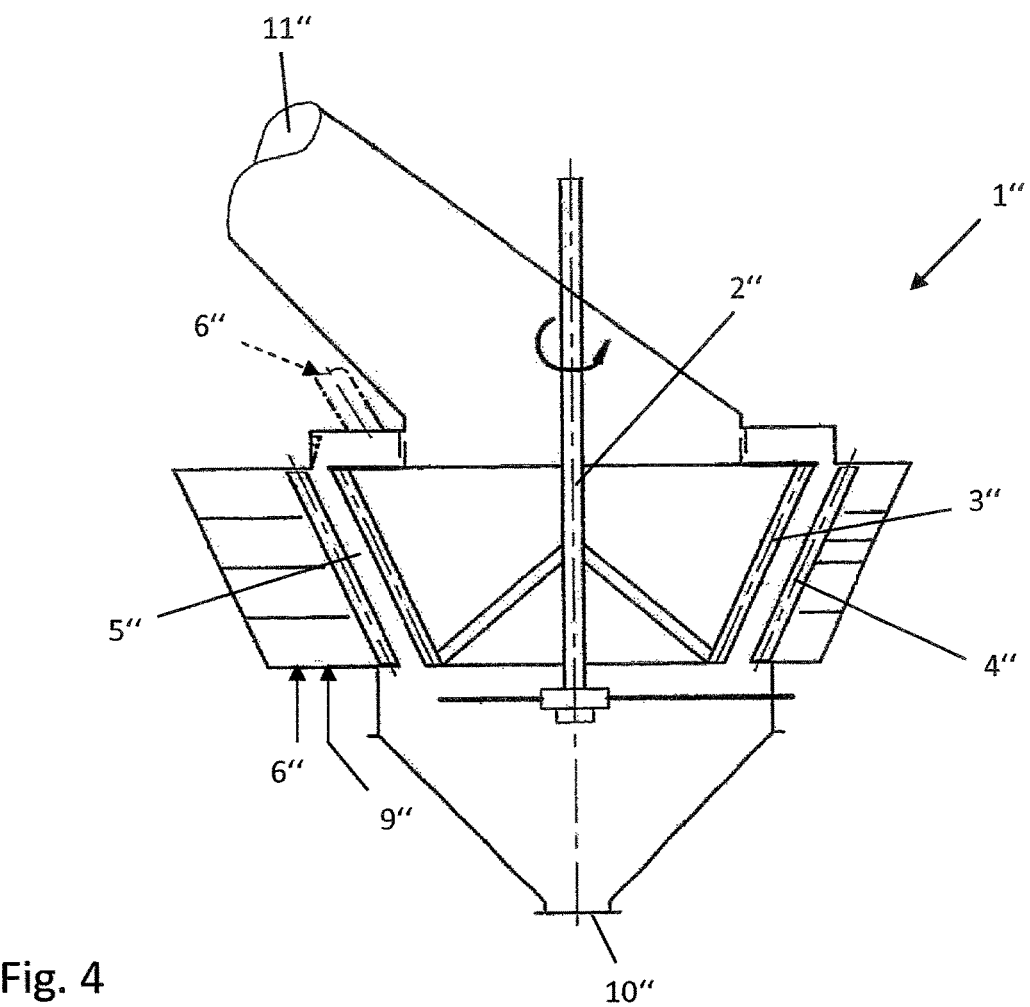
FIG. 4 is a schematic cross section view of an embodiment of a classifier with a frustoconical rotary cage, as disclosed herein.

In the exemplary embodiment according to FIG. 4, a classifier 1" is provided, with a frustoconical rotary cage 3" which once again rotates about a vertical rotor axis 2". The air-guiding system 4" is accordingly formed in a complementary manner, such that, once again, a classifying zone 5" is provided between the rotary cage 3" and the air-guiding system 4". The feedstock 6" can optionally be supplied with the classifying air 9" and/or separately therefrom directly to the classifying zone 5". Once again, the coarse material is removed via a coarse material outlet 10" and the fine material via a fine material outlet 11".

In addition to the represented classifier variants, still other configurations, for example a step-shaped configuration of the classifier cage with cylindrical and/or frustoconical sections, are of course conceivable within the context of the invention. Although an essentially vertical rotor axis is preferred, a horizontal rotor axis is in principle also conceivable.

In FIGS. 5-12, the reference signs 3, 4 and 5 are each respectively used for the rotary cage, the air-guiding system and the classifying zone, even when the explanations refer to the exemplary embodiments of FIGS. 2-4.

Figure 5:
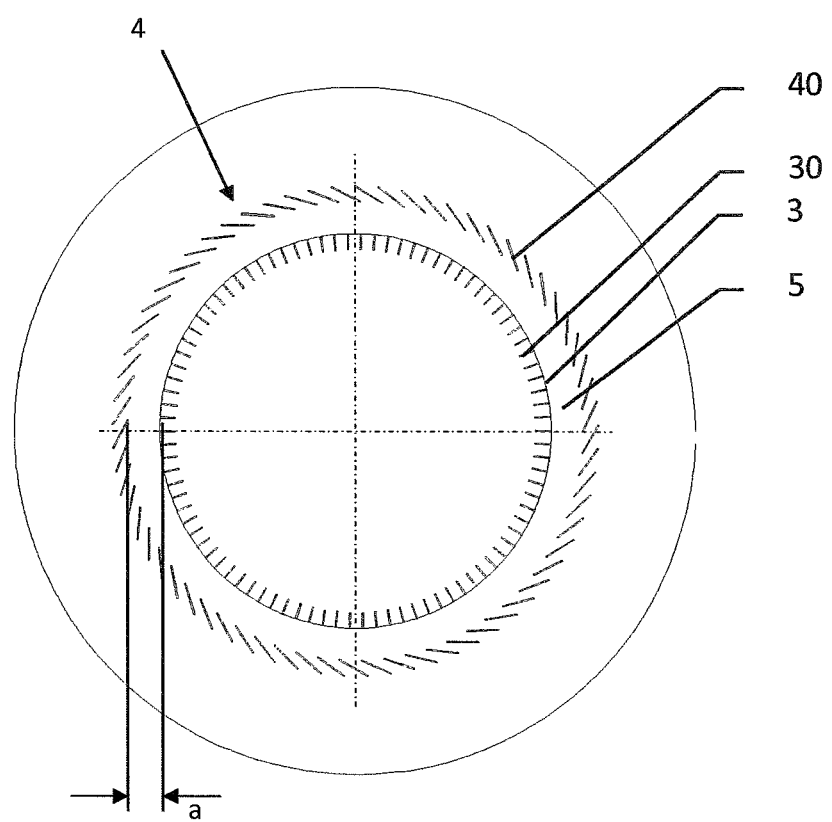
FIG. 5 is a cross section view of an embodiment of a classifier oriented perpendicular to a rotor axis, as disclosed herein.

In the cross section representation of FIG. 5, the air-guiding system 4 is formed with guide plates 40 and the rotary cage 3 is equipped with rotary cage blades 30. The classifying zone 5 is once again formed by the space between the air-guiding system and the rotary cage. In that context, the separation a between the air-guiding system 4 and the rotary cage 3 is chosen such that the torque M acting on the rotor increases—for the same rotational speed—by at least 20% with respect to an embodiment wherein the separation of the air-guiding system is without influence on the torque of the rotary cage.

Figure 6:
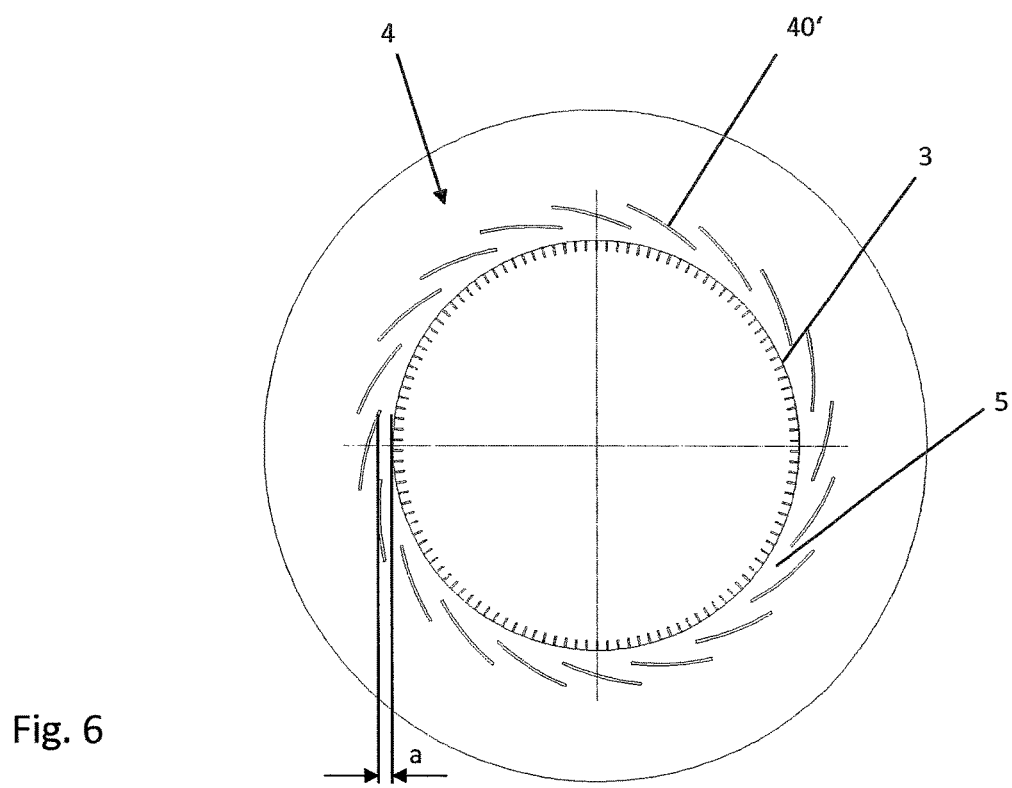
FIG. 6 is a cross section view of an alternate embodiment of a classifier oriented perpendicular to a rotor axis, as disclosed herein.

In the exemplary embodiment as shown in FIG. 6, the air-guiding system 4 is formed by curved guide plates 40'. Here, too, the separation a between the air-guiding system and the rotary cage is chosen such that the torque M acting on the rotary cage increases—for the same rotational speed—by at least 20% with respect to an embodiment wherein the separation of the air-guiding system is without influence on the torque of the rotary cage.

Figure 7:
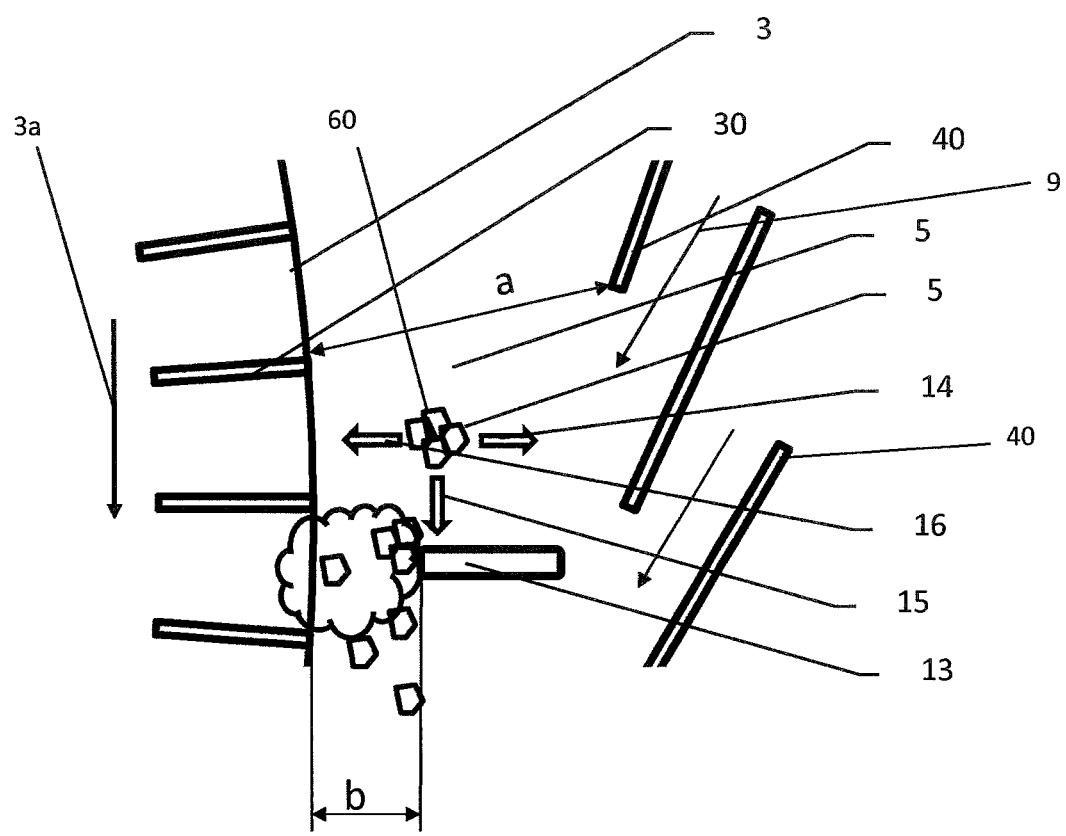
FIG. 7 is a detail view of an embodiment of a classifier of the present disclosure having a baffle disposed in the classifying zone.

As shown in FIG. 7, there is provided, in the classifying zone 5, a baffle 13, wherein all of the baffles 13 present in the classifying zone 5 are arranged such that the torque acting on the rotary cage once again increases—for the same rotational speed—by at least 20% with respect to an embodiment without baffles. In that context, the separation b with respect to the rotary cage 3 need not necessarily be the same for all the baffles.

Within the context of the invention, it is also conceivable that the at least 20% increase in torque is caused both by the baffles 13 in the classifying zone 5 and by a reduced separation a between the air-guiding system 4 and the rotary cage 3. The baffles 13 and/or the air-guiding system 4 positioned closer to the rotary cage 3 have the effect that an agglomerated feedstock particle 60 is at least partially deagglomerated by the baffles 13 and/or the air-guiding system 4, and thus a more efficient classification is made possible. In that context, the agglomerated feedstock particle 60 is acted upon—in the case of the indicated direction of rotation 3a of the rotary cage 3—by the centrifugal force 14, the carrying force 15 and the centrifugal force 16, as well as the force of gravity acting into the plane of the drawing. Depending on the mass of the feedstock particle, it is then either drawn as fine material into the rotary cage 3 or is ejected downwards as coarse material.

Figure 8:
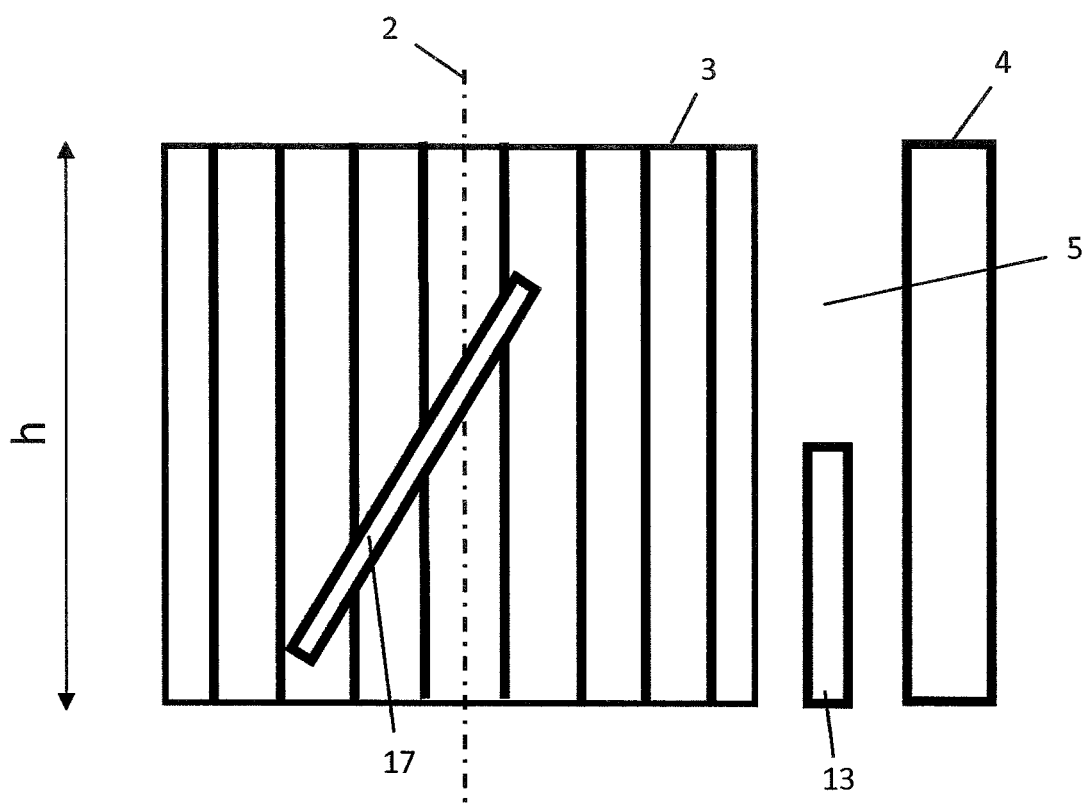
FIG. 8 is a schematic side view of an embodiment of a classifier with baffles, as disclosed herein.

The representation of FIG. 8 shows that the rotary cage 3 extends over a height h in the direction of the rotor axis 2 (axial extent of the rotary cage). The baffles 13, 17 can extend over the entire height h or only over part thereof. It is also conceivable that the baffles are arranged in parallel (baffle 13) or not parallel (baffle 17) in the classifying zone 5.

Figure 9:
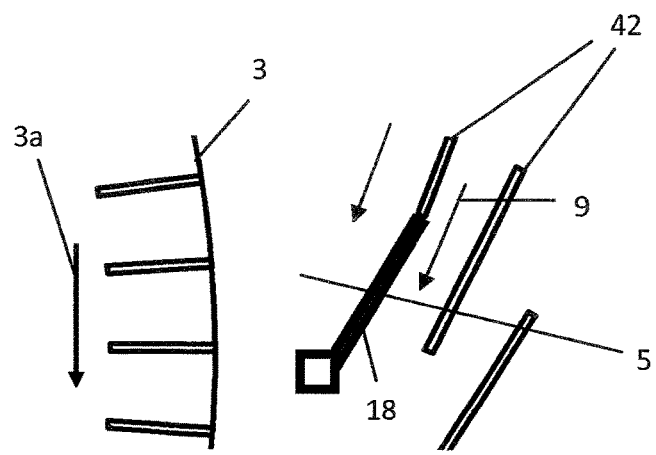
FIG. 9 is a detail view of an embodiment of a classifier with baffles, as disclosed herein, which baffles are formed by end regions of some guide plates.

FIG. 9 illustrates a variant in which the baffles 18 are formed by end regions of a guide plate 42 of the air-guiding system. In that context, the baffle 18 projects into the classifying zone 5, wherein all of the baffles and, if relevant, the separation between the air-guiding system effect the at least 20% increase in the torque M of the rotary cage 3. In principle, the baffles can be formed in any manner in order to have the desired effect on the feedstock. In that context, it is in particular conceivable that baffles having various forms are provided in the classifying zone 5.

Figure 10:
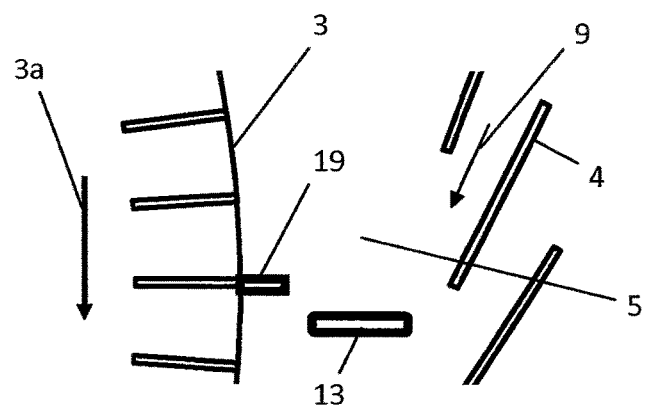
FIG. 10 is a detail view of an embodiment of a classifier having a component that rotates with the rotary cage, as disclosed herein.

In order to generate individual inhomogeneous flow regions within the classifying zone 5, it is furthermore possible to also provide components 19 which rotate with the rotary cage 3 and project into the classifying zone 5, and which, in conjunction with the baffles 13, create the flow turbulence (FIG. 10).

Figure 11:
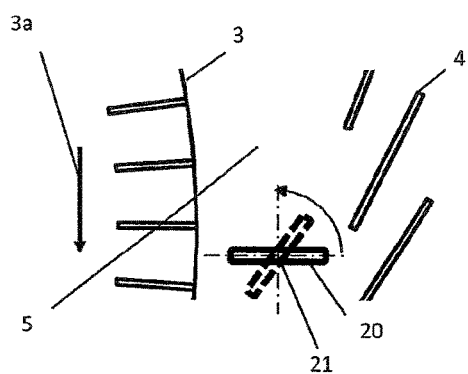
FIG. 11 is a schematic detail view of an embodiment of a rotatable baffle for setting a separation with respect to a rotary cage, as disclosed herein.
Figure 12:
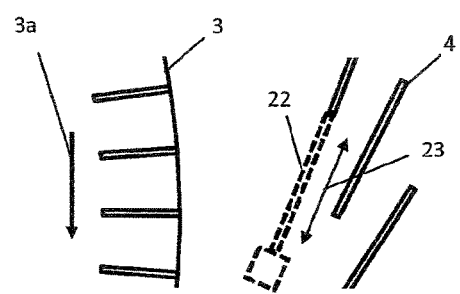
FIG. 12 is a schematic detail view of an embodiment of a displaceable baffle for setting a separation with respect to a rotary cage, as disclosed herein.

According to one particular configuration of the invention, the baffles 20 arranged in the classifying zone 5 can be arranged such that they are able to rotate about an axis of rotation 21, in order in this manner to be able to set the separation with respect to the rotary cage 3 (FIG. 11). The separation of a baffle 22 can, however, also set by shifting the baffle along the double arrow 23, as shown in FIG. 11.

Figure 13:
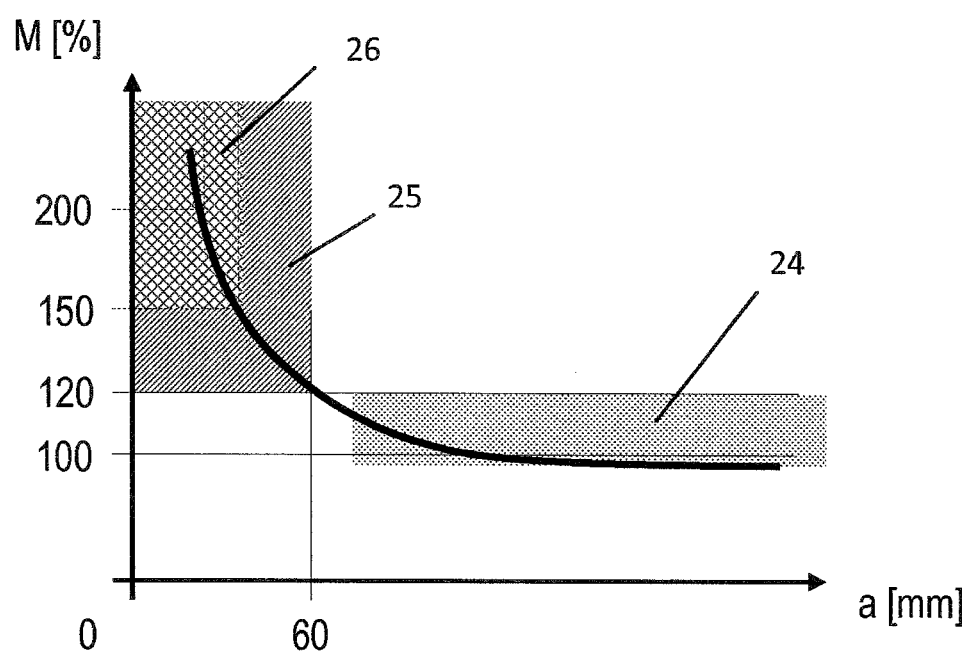
FIG. 13 is a graph depicting torque as a function of a separation between an air-guiding system and a rotary cage, as disclosed herein.

The diagram shown in FIG. 13 shows the influence of the separation a between the air-guiding system 4 and the rotor 3 as a function of the torque M of the rotary cage 3 for a given rotational speed. It shows that the torque M decreases as the separation a between the air-guiding system and the rotary cage increases, and that, beyond a certain separation, the air-guiding system ceases to have an influence on the torque. In this state, the torque M has the value 100% in FIG. 13. The shaded area 24 shows, in that context, the region known from the prior art, according to which the separation between the guiding system and the rotary cage is greater than 60 mm.

According to the invention, the power of the torque M should be raised, by reducing the separation between the air-guiding system 4 and the rotary cage 3 and/or by means of additional baffles in the classifying zone 5, to at least 120% (region 25), preferably to at least 150% (region 26). Particular preference is given to a region of greater than 175% or even greater than 200% of the torque with respect to an embodiment without baffles and/or with a separation of the air-guiding system which has no effect on the torque of the rotary cage.

Figure 14:
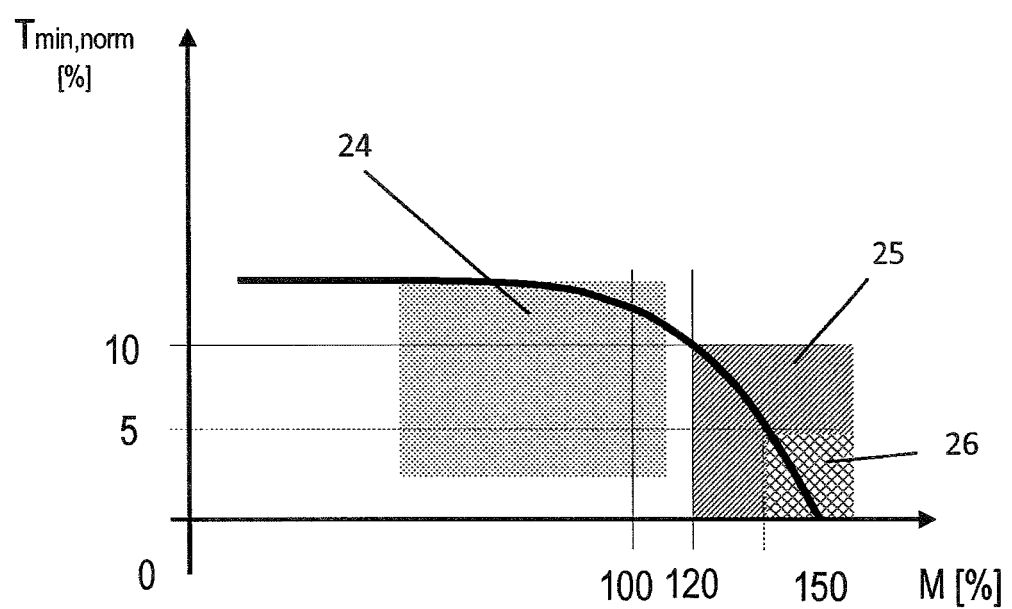
FIG. 14 is a graph depicting a bypass rate as a function of torque, as disclosed herein.

The diagram of FIG. 14 illustrates the effect of an increased torque M with respect to the bypass $T_{min, norm}$. The bypass $T_{min, norm}$ is the minimal degree of separation of the separation curve of a classifier. The bypass is at a particle size which is smaller than that at which lies the separating cut of the classifier (see common practice of the Tromp analysis of separation curves). The bypass thus represents a measure for the fraction of fine material which is rejected by the classifier, with the coarse material, on account of agglomerate formation. In order to compare classifiers, the bypass $T_{min, norm}$ [%] is generally normalized to a recirculation factor (ratio of classifier feed to fine material) of 2, in order to separate the influences of the raw material and the grinding process from the bypass value. The curve shows that the bypass $T_{min, norm}$ already shows a marked reduction starting at a 20% increase in torque. Thus, a classifier according to the invention makes it possible to achieve a marked reduction in the fine material fraction in the coarse material.

Figure 15:
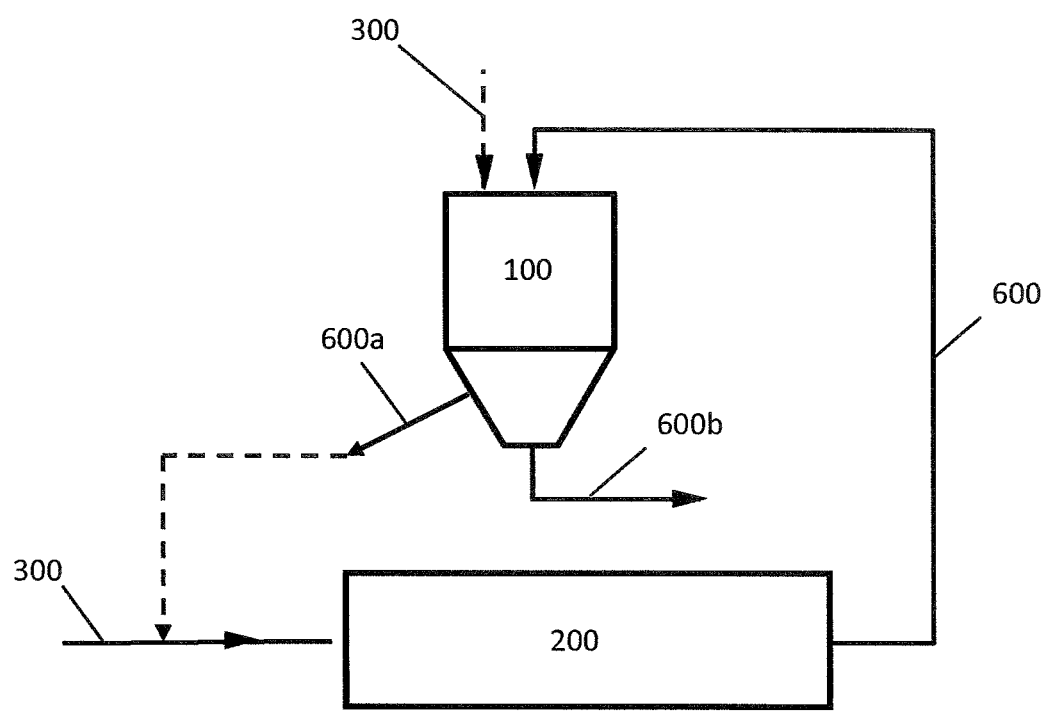
FIG. 15 is a flow chart showing the processes of an embodiment of a grinding plant consisting of a mill and a classifier, as disclosed herein.

FIG. 15 shows a grinding plant having a classifier 100, which is formed according to one of the above-described exemplary embodiments, and a mill 200. The feedstock 600 comminuted in the mill 200 is supplied to the classifier 100 and is classified into coarse material 600a and fine material 600b. By virtue of the design according to the invention of the classifier 100, the fraction of fine material in the coarse material 600a is markedly reduced.

According to a particularly advantageous configuration of the invention, the classifier 100 and the mill 200 are operated as a recirculating grinding plant, wherein the coarse material 600a is fed back to the mill 200 where it is again comminuted, together with fresh material 300. Alternatively, it is also possible for the fresh material to be first fed to the classifier. The mill 200 can in particular be a ball mill, a vertical and horizontal roller mill, an attritor or a high-pressure roller press.

The trials underpinning the invention have shown that the additional energy required for the classifier is more than compensated for, even in the case of a 100% increase in the torque of the rotary cage, by the increased processing of fresh material 300 in the mill 200, such that finally it is possible to reduce the energy consumption per tonne of fine material 600b per hour. The additional rotational energy caused by the increased torque of the rotary cage does indeed cause an increased classifying energy, but the specific energy requirement of the overall grinding system is still reduced. According to the research done up to now, energy savings of 10-20% and more are conceivable.

The invention claimed is:

1. A method of operating a classifier for classifying granular feedstock, comprising:
    rotating a rotary cage of the classifier;
    through an air-guiding system that surrounds and is separated a distance from the rotary cage, aspirating classifying air into a classifying zone formed between the rotary cage and the air-guiding system, which classifying zone includes one or more baffles that have an orientation, size, and shape that generate an inhomogeneous flow field at the circumference of the rotary case that, together with the separation distance, generate an increase of torque acting on said rotating rotary cage by at least 20% as compared to an amount of torque acting on said rotary cage that would result from the classifying zone having no baffles disposed therein and the separation distance having no influence on the torque: and
    feeding the granular feedstock into the classifying zone.

2. The method of claim 1, wherein said step of feeding the granular feedstock into the classifying zone and said step of aspirating classifying air into a classifying zone are both performed together through the air-guiding system.

3. The method of claim 1, wherein said feeding step includes feeding at least a part of the granular feedstock to the classifying zone separately from the classifying air.

4. A classifier for classifying granular feedstock, comprising:
    a rotary cage configured to rotate about a rotor axis;
    an air-guiding system disposed around said rotary cage that is separated a distance from said rotary cage and defines a classifying zone between said rotary cage and said air-guiding system, said air guiding system configured to aspirate classifying air into said classifying zone; and
    a plurality of baffles disposed in said classifying zone, the plurality of baffles having an orientation, size, and shape that generate an inhomogeneous flow field at the circumference of the rotary cage that, together with the separation distance between said rotary cage and said air-guiding system, generate an increase of torque acting on said rotary cage by at least 20% as compared to an amount of torque acting on said rotary cage that would result from the classifying zone having no baffles disposed therein and the separation distance having no influence on the torque.

5. The classifier of claim 4, wherein a largest diameter of said rotary cage is at least 0.5 m.

6. The classifier of claim 4, wherein the separation distance between the air-guiding system and the rotary cage is less than 60 mm.

7. The classifier of claim 4, where said rotary cage, air guiding system, and baffles are configured to permit an adjustment of at least one of the separation distance between said rotary cage and air guiding system, or a separation distance between said baffles and said rotary cage.

8. The classifier of claim 4, wherein said air-guiding system comprises a plurality of guide plates, and wherein said baffles are coupled to at least a portion of said guide plates.

9. The classifier of claim 4, wherein said air-guiding system comprises a plurality of guide plates, and wherein said baffles are formed by end regions of at least a portion of said guide plates, wherein said end regions project into said classifying zone.

10. The classifier of claim 4, wherein said baffles are oriented non-parallel to said rotor axis.

11. The classifier of claim 4, wherein said baffles extend over at least a portion of an axial extent of said rotary cage.

12. The classifier of claim 4, wherein said rotary cage further includes additional components that project into said classifying zone are configured to rotate with said rotary cage to generate an inhomogeneous flow field in said classifying zone.

13. The classifier of claim 4, wherein said rotary cage is configured to rotate about an essentially vertically oriented axis.

14. The classifier of claim 4, wherein said rotary cage is at least one of cylindrical, frustoconical, or stepwise shaped.

15. The classifier of claim 4, further comprising:
a classifying air supply configured to aspirate classifying air into said classifying zone;
a material feed in operative communication with said rotary cage and configured to feed material to be classified into said classifying zone;
a coarse material outlet in operative communication with said rotary cage and configured to channel coarse classified material out of said classifier;
and a fine material outlet in operative communication with said rotary cage and configured to channel fine classified material out of said classifier, separately from said coarse material.

16. A grinding plant for grinding granular feedstock, comprising:
a mill;
the classifier of claim 4 in operative communication with said mill.

* * * * *